United States Patent
Ding et al.

(10) Patent No.: US 11,576,024 B2
(45) Date of Patent: Feb. 7, 2023

(54) METHOD AND APPARATUS FOR MAKING EMERGENCY CALL

(71) Applicant: Huawei Technologies Co., Ltd., Shenzhen (CN)

(72) Inventors: Ming Ding, Beijing (CN); Fenghui Dou, Beijing (CN); Jie Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/261,813

(22) PCT Filed: Aug. 12, 2019

(86) PCT No.: PCT/CN2019/100243
§ 371 (c)(1),
(2) Date: Jan. 20, 2021

(87) PCT Pub. No.: WO2020/034923
PCT Pub. Date: Feb. 20, 2020

(65) Prior Publication Data
US 2021/0297840 A1 Sep. 23, 2021

(30) Foreign Application Priority Data
Aug. 15, 2018 (CN) .......................... 201810929696.4

(51) Int. Cl.
| H04W 4/90 | (2018.01) |
| H04W 76/50 | (2018.01) |
| H04W 4/02 | (2018.01) |
| H04W 84/12 | (2009.01) |

(52) U.S. Cl.
CPC ............. *H04W 4/90* (2018.02); *H04W 4/025* (2013.01); *H04W 76/50* (2018.02); *H04W 84/12* (2013.01)

(58) Field of Classification Search
CPC ........ H04W 4/025; H04W 4/90; H04W 76/50
(Continued)

(56) References Cited

U.S. PATENT DOCUMENTS

| 9,538,351 B1 | 1/2017 | Chen et al. |
| 2007/0060097 A1 | 3/2007 | Edge et al. |

(Continued)

FOREIGN PATENT DOCUMENTS

| CN | 101352058 A | 1/2009 |
| CN | 102395143 A | 3/2012 |

(Continued)

OTHER PUBLICATIONS

"LS on VoLTE Roaming Architecture," RAG 14 Doc 003, SA WG2 Meeting #109, S2-151440, Fukuoka, Japan, Total 5 pages 3rd Generation Partnership Project, Valbonne, France (May 25-29, 2015).

(Continued)

*Primary Examiner* — Joel Ajayi
(74) *Attorney, Agent, or Firm* — Leydig, Voit & Mayer, Ltd.

(57) ABSTRACT

This application provides a method and an apparatus for making an emergency call. The method includes: obtaining location information of UE; determining, based on the local information, whether the UE is located in a home country of an HPLMN of the UE; and when the UE is located in the home country of the HPLMN, if a predetermined condition is satisfied, initiating a VoWiFi emergency call by using an IMS APN of the HPLMN, where the predetermined condition includes: the UE has completed IMS registration, and a PLMN on which the UE camps includes no emergency APN. According to the method and apparatus for making an emergency call provided in this application, a VoWiFi emergency call success rate can be increased to some extent.

20 Claims, 6 Drawing Sheets

(58) Field of Classification Search
USPC ...................................................... 455/404.2
See application file for complete search history.

(56) References Cited

U.S. PATENT DOCUMENTS

| | | | | |
|---|---|---|---|---|
| 2010/0167755 | A1* | 7/2010 | Kim | H04W 48/18 |
| | | | | 455/456.1 |
| 2016/0142447 | A1* | 5/2016 | Mufti | H04L 65/1093 |
| | | | | 370/260 |
| 2017/0005914 | A1 | 1/2017 | Edge et al. | |
| 2018/0091967 | A1* | 3/2018 | Gupta | H04W 8/02 |
| 2019/0044980 | A1* | 2/2019 | Russell | H04W 12/06 |
| 2019/0159160 | A1* | 5/2019 | Albasheir | H04W 36/36 |

FOREIGN PATENT DOCUMENTS

| | | |
|---|---|---|
| CN | 104094666 A | 10/2014 |
| CN | 104823512 A | 8/2015 |
| CN | 104955009 A | 9/2015 |
| CN | 105706471 A | 6/2016 |
| CN | 106576230 A | 4/2017 |
| CN | 107172605 A | 9/2017 |
| CN | 107431885 A | 12/2017 |
| CN | 107710831 A | 2/2018 |
| WO | 2012168146 A1 | 12/2012 |
| WO | 2016078086 A1 | 5/2016 |

OTHER PUBLICATIONS

"3rd Generation Partnership Project; Technical Specification Group Core Network and Terminals; IP multimedia call control protocol based on Session Initiation Protocol (SIP) and Session Description Protocol (SDP); Stage 3 (Release 15)," 3GPP TS 24.229 V15.3.0, pp. 1-1019, 3rd Generation Partnership Project, Valbonne, France (Jun. 2018).

* cited by examiner

METHOD AND APPARATUS FOR MAKING EMERGENCY CALL

CROSS-REFERENCE TO RELATED APPLICATIONS

This application is a national stage of International Application No. PCT/CN2019/100243, filed on Aug. 12, 2019, which claims priority to Chinese Patent Application No. 201810929696.4, filed on Aug. 15, 2018. Both of the aforementioned applications are hereby incorporated by reference in their entireties.

TECHNICAL FIELD

Embodiments of this application relate to the wireless communications field, and in particular, to a method and an apparatus for making an emergency call.

BACKGROUND

A VoLTE (Voice over LTE) technology is a voice transmission technology based on an IP multimedia subsystem. A higher quality and more natural voice call effect can be provided for a user by using the VoLTE technology, and therefore the technology is increasingly widely applied.

As the VoLTE technology is increasingly widely applied, an emergency call becomes one of basic functions that need to be implemented in the VoLTE technology. The emergency call is a telephone service that allows a mobile subscriber to connect an emergency call to an answering organization in a timely manner by using a simple dialing method in the case of an emergency. When no subscriber identity module (SIM) card is inserted into user equipment (UE) or UE is locked, the answering organization can still be connected by using an emergency call, to give an alarm or seek help.

Before the UE makes an emergency call by using the VoLTE technology, the UE needs to first interact with a network side to complete network camping and IMS registration. When the UE needs to initiate an emergency call through VoLTE, if a public land mobile network (PLMN) on which the UE camps includes an emergency APN for an emergency call, the UE may initiate a VoLTE emergency call by using the emergency APN. If the UE camps on a home public land mobile network (HPLMN), when the HPLMN includes no emergency APN, the UE may initiate a VoLTE emergency call by using an IMS APN of the HPLMN.

However, in actual application, in some specific environments such as a high building or a basement, there may be relatively poor cellular signal coverage due to a complex cellular signal coverage status of a telecommunications operator. When cellular signal coverage of each telecommunications operator is excessively poor, a VoLTE emergency call may fail, resulting in a low emergency call success rate.

SUMMARY

This application provides a method and an apparatus for making an emergency call, to increase a VoWiFi emergency call success rate.

According to a first aspect, this application provides a method for making an emergency call, including: obtaining location information of UE when a VoWiFi emergency call needs to be initiated; and if the UE has completed IMS registration and a PLMN on which the UE camps includes no emergency APN, when it is determined, based on the location information, that the UE is located in a home country of an HPLMN of the UE, initiating an emergency call by using an IMS APN of the HPLMN.

With reference to the first aspect, in a first possible implementation of the first aspect, the obtaining location information of UE may include: obtaining the location information of the UE by using a positioning system; or obtaining a mobile country code MCC of the UE.

With reference to the first possible implementation of the first aspect, in a second possible implementation of the first aspect, the positioning system includes a satellite positioning system or a wireless fidelity WiFi positioning system.

With reference to any one of the first aspect or the first and the second possible implementations of the first aspect, in a third possible implementation of the first aspect, the obtaining location information of UE includes: detecting whether the UE has completed IMS registration; if the UE has completed IMS registration, detecting whether an emergency APN is set in the PLMN on which the UE camps; and if no emergency APN is set in the PLMN, obtaining the location information of the UE.

With reference to any one of the first aspect or the first and the second possible implementations of the first aspect, in a fourth possible implementation of the first aspect, the obtaining location information of UE includes: detecting whether an emergency APN is set in the PLMN on which the UE camps; if no emergency APN is set in the PLMN, detecting whether the UE has completed IMS registration; and if the UE has completed IMS registration, obtaining the location information of the UE.

With reference to any one of the first aspect or the first and the second possible implementations of the first aspect, in a fifth possible implementation of the first aspect, before the initiating a VoWiFi emergency call by using an IMS APN of the HPLMN, the method further includes: detecting, based on the location information, whether the UE is located in the home country of the HPLMN of the UE; if the UE is located in the home country of the HPLMN of the UE, detecting whether an emergency APN is set in the PLMN on which the UE camps; and if no emergency APN is set in the PLMN, detecting whether the UE has completed IMS registration.

With reference to any one of the first aspect or the first and the second possible implementations of the first aspect, in a sixth possible implementation of the first aspect, before the initiating a VoWiFi emergency call by using an IMS APN of the HPLMN, the method further includes: detecting, based on the location information, whether the UE is located in the home country of the HPLMN of the UE; if the UE is located in the home country of the HPLMN of the UE, detecting whether the UE has completed IMS registration; and if the UE has completed IMS registration, detecting whether an emergency APN is set in the PLMN on which the UE camps.

With reference to any one of the first aspect or the first and the second possible implementations of the first aspect, in a seventh possible implementation of the first aspect, before the initiating a VoWiFi emergency call by using an IMS APN of the HPLMN, the method further includes: detecting, based on the location information, whether the UE is located in the home country of the HPLMN of the UE; detecting whether the UE has completed IMS registration; and detecting whether an emergency APN is set in the PLMN on which the UE camps.

With reference to any one of the first aspect or the first to the seventh possible implementations of the first aspect, in an eighth possible implementation of the first aspect, the obtaining location information of user equipment UE includes: obtaining the location information of the UE after a VoLTE emergency call fails.

With reference to any one of the first aspect or the first to the seventh possible implementations of the first aspect, in an eighth possible implementation of the first aspect, the obtaining location information of user equipment UE includes: initiating a VoWiFi emergency call by using the IMS APN of the HPLMN after a VoLTE emergency call fails.

According to a second aspect, this application further provides an apparatus for making an emergency call, and the apparatus includes unit modules configured to perform the method according to the first aspect and the implementations of the first aspect. The unit modules may include: an obtaining unit, configured to obtain location information of user equipment UE; a determining unit, configured to determine, based on the location information, whether the UE is located in a home country of an HPLMN of the UE; and an execution unit, configured to: when the UE is located in the home country of the HPLMN, if a predetermined condition is satisfied, initiate a VoWiFi emergency call by using an IP multimedia subsystem IMS access point name APN of the HPLMN, where the predetermined condition includes: the UE has completed IMS registration and a PLMN on which the UE camps includes no emergency APN.

According to a third aspect, this application further provides a wireless communications device, including a memory, a processor, and a computer program that is stored in the memory and that can run on the processor, where when the processor executes the program, the method according to any one of the first aspect or the implementations of the first aspect is implemented.

According to a fourth aspect, this application further provides a computer-readable storage medium, including an instruction, where when the instruction runs on a computer, the computer is enabled to perform the method according to any one of the first aspect or the implementations of the first aspect.

According to a fifth aspect, this application further provides a computer program product. When the computer program product runs on a computer, the computer is enabled to perform the method according to any one of the first aspect or the implementations of the first aspect.

According to a sixth aspect, this application further provides an apparatus. The apparatus includes a processor, and the processor is configured to: be coupled to a memory, read an instruction in the memory, and perform the method according to any one of the first aspect or the implementations of the first aspect based on the instruction.

According to the method and apparatus for making an emergency call and the like provided in this application, when the UE is located in the home country of the HPLMN, even if the UE camps on a VPLMN, the UE can initiate a VoWiFi emergency call. In this way, a VoWiFi emergency call success rate can be increased to some extent.

DESCRIPTION OF EMBODIMENTS

To increase an emergency call success rate, this application provides a technical solution for making an emergency call based on a VoWiFi (Voice over WiFi) technology. The VoWiFi technology is a technology in which a user makes voice and video calls by accessing a WiFi network in a WiFi environment.

After UE camps on a PLMN and registers with an IMS, if the UE has accessed a WiFi network, the UE may initiate a VoWiFi emergency call after emergency call methods (for example, a VoLTE emergency call) based on a cellular signal fail. Alternatively, the UE may directly initiate a VoWiFi emergency call without initiating an emergency call based on a cellular signal. The WiFi network and a cellular network are independent of each other. Therefore, when an emergency call is made through VoWiFi, an emergency call success rate can be effectively increased in a case with relatively poor cellular signal coverage, for example, a high building or a basement.

Figure 1:
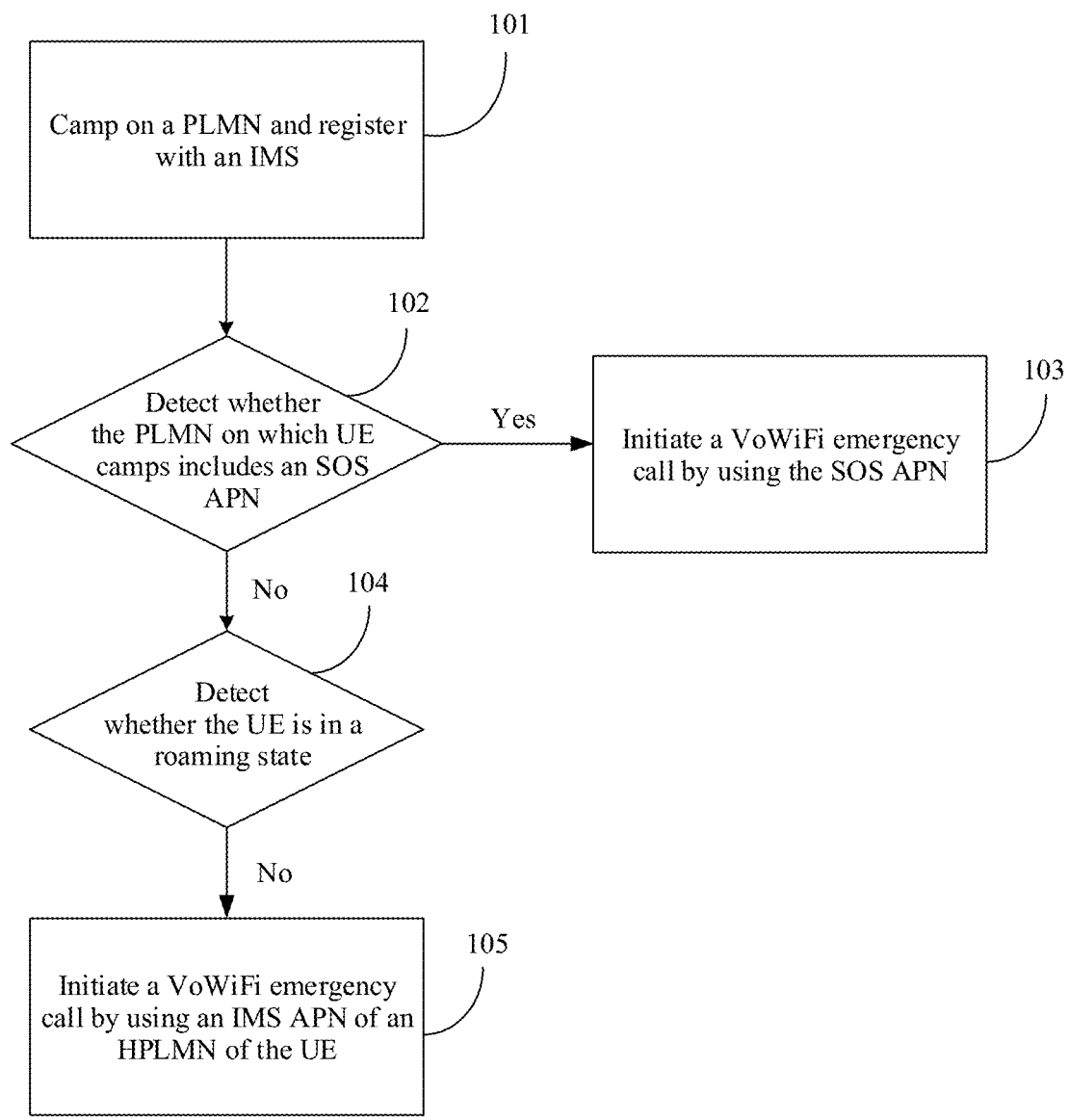
FIG. 1 is a schematic flowchart of an embodiment of a method for making a VoWiFi emergency call according to this application.

FIG. 1 is a schematic diagram of an embodiment of a method for making a VoWiFi emergency call according to this application. A VoWiFi emergency call initiation procedure may be shown in FIG. 1.

Step 101: UE camps on a PLMN and registers with an IMS.

Step 102: The UE checks whether the PLMN on which the UE camps includes an emergency APN.

The PLMN on which the UE camps may be a VPLMN or an HPLMN.

Step 103: If the PLMN on which the UE camps includes an emergency APN, the UE may initiate a VoLTE emergency call by using the emergency APN.

When the emergency APN is set in the PLMN on which the UE camps, the UE may initiate a VoLTE emergency call by using the emergency APN. Usually, the emergency APN may also be referred to as an SOS APN or an eAPN.

If the PLMN on which the UE camps includes no emergency APN, whether the UE can initiate a VoWiFi emergency call by using an IMS APN may be further determined based on a roaming state of the UE. Details may be shown in step 104.

Step 104: If the PLMN on which the UE camps includes no emergency APN, detect whether the UE is in the roaming state.

Usually, whether the UE is in the roaming state may be determined based on the PLMN on which the UE camps. If the UE camps on an HPLMN, it may be determined that the UE is in a non-roaming state. If the UE camps on a VPLMN, it may be determined that the UE is in the roaming state.

Step 105: If the UE is not in the roaming state, initiate a VoWiFi emergency call by using an IMS APN of the HPLMN.

When the PLMN on which the UE camps includes no emergency APN, the UE in the non-roaming state can initiate a VoWiFi emergency call by using the IMS APN of the HPLMN, and the UE in the roaming state cannot initiate a VoWiFi emergency call by using the IMS APN of the HPLMN. That is, when the UE registers with the IMS and the PLMN on which the UE camps includes no emergency APN, if the UE camps on the HPLMN, the UE can initiate a VoWiFi emergency call by using the IMS APN of the HPLMN. However, if the UE camps on the VPLMN, the UE cannot initiate a VoWiFi emergency call by using the IMS APN of the HPLMN.

In this way, it can be ensured that an emergency call is answered by a correct answering party, so that an emergency call function can really play a role that the emergency call function should play. In addition, a case in which a normal VoWiFi emergency call in a country cannot be made due to a malicious attack from outside the country can be avoided.

Figure 2:
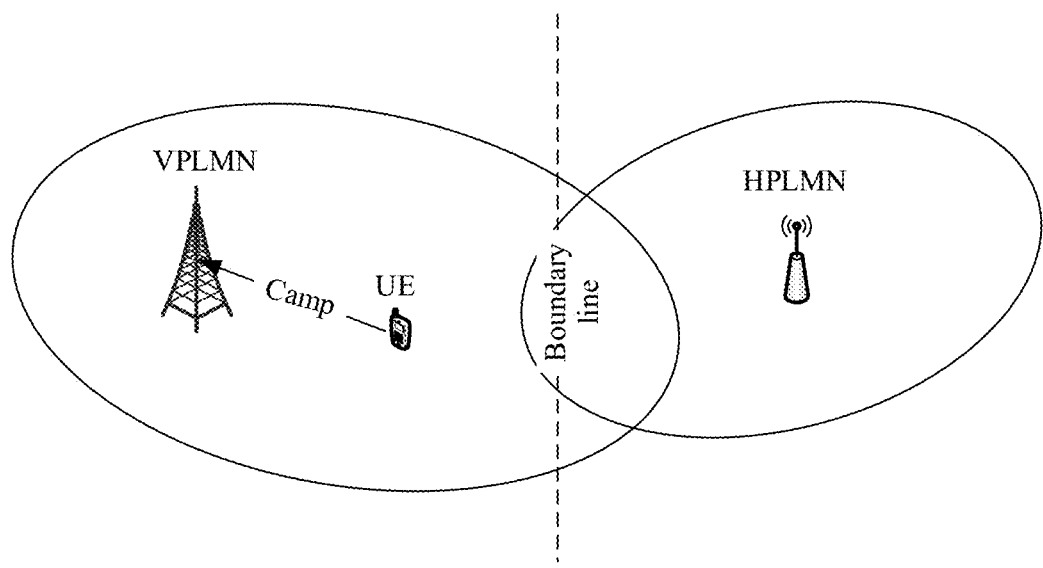
FIG. 2 is a schematic diagram of an application scenario according to this application.

For example, as shown in FIG. 2, when a home country of the HPLMN of the UE is country A and a home country of the VPLMN is country B, if the UE initiates a VoWiFi emergency call by using the IMS APN of the HPLMN of the UE in the roaming state, the VoWiFi emergency call initiated by the UE in country B is answered by an answering organization in country A. In this case, the emergency call is answered by an incorrect answering party. In the non-roaming state, if the UE initiates a VoWiFi emergency call by using the IMS APN of the HPLMN of the UE, the VoWiFi emergency call may be answered by the answering organization in country A. The UE in the non-roaming state can initiate a VoWiFi emergency call by using the IMS APN of the HPLMN, and the UE in the roaming state cannot initiate a VoWiFi emergency call by using the IMS APN of the HPLMN. In this way, a case in which an emergency call is answered by an incorrect answering party and a case in which a function that should be implemented by an emergency call cannot be implemented can be avoided.

Figure 3:
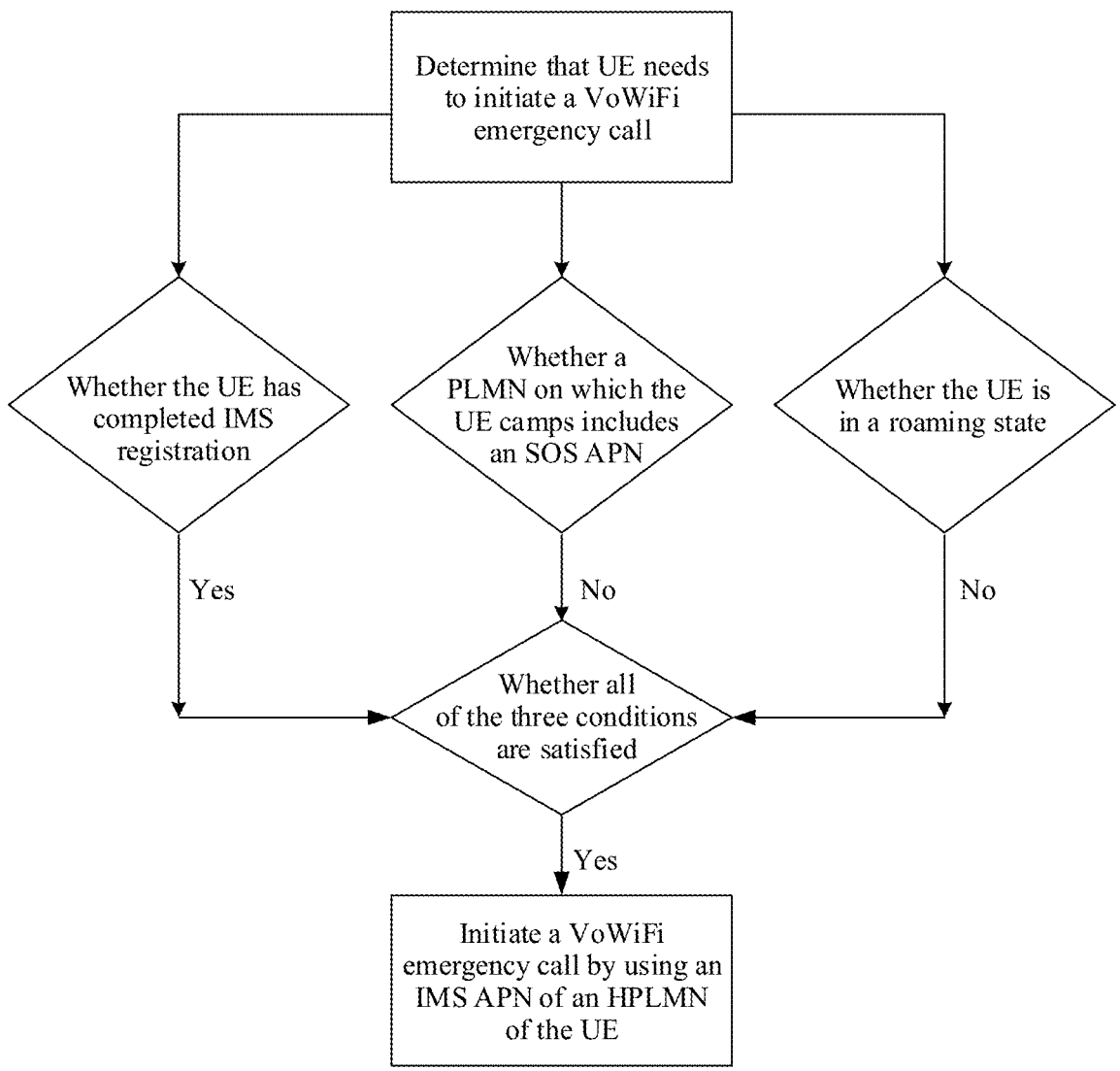
FIG. 3 is a schematic diagram of determining logic of a method for making a VoWiFi emergency call according to this application.

A sequence of the steps is not limited in this application. In another embodiment, whether the UE is in the roaming state may be first detected. When the UE is not in the roaming state, whether the PLMN on which the UE camps includes an emergency APN is then checked. If the PLMN on which the UE camps includes no emergency APN, the UE initiates a VoWiFi emergency call by using the IMS APN of the HPLMN. Overall determining logic of the technical solution may be shown in FIG. 3. All technical solutions based on the determining logic shown in FIG. 3 fall within the protection scope of this application.

In the technical solution shown in FIG. 1, when a VoLTE emergency call fails due to relatively poor cellular signal coverage, an emergency call can be made through VoWiFi, to increase an emergency call success rate.

In actual application, if whether the UE can initiate a VoWiFi emergency call by using the IMS APN of the HPLMN is determined based on whether the UE is in the roaming state, when a VoWiFi emergency call can be correctly answered, the UE may fail to initiate a VoWiFi emergency call.

Figure 4:
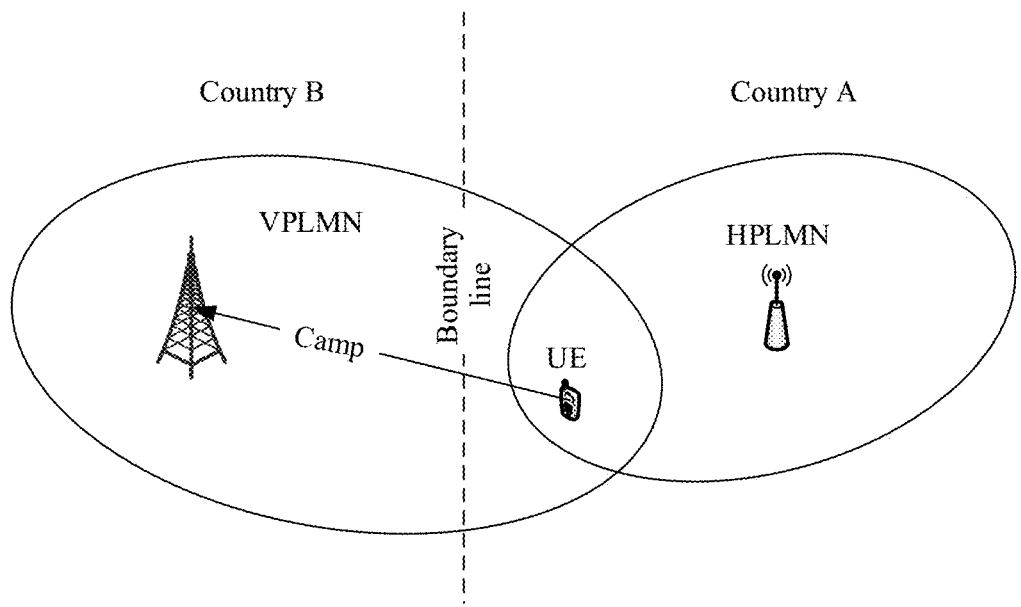
FIG. 4 is a schematic diagram of another application scenario according to this application.

For example, as shown in FIG. 4, when the UE is located in the home country, namely, country A, of the HPLMN of the UE, and the UE camps on the VPLMN, even if the home country of the VPLMN is not country A, a VoWiFi emergency call initiated by the UE by using the IMS APN of the HPLMN can be answered by a correct answering party (namely, the answering organization in country A). Therefore, the UE should be allowed to initiate a VoWiFi emergency call by using the IMS APN of the HPLMN. However, actually, the UE cannot initiate a VoWiFi emergency call by using the IMS APN of the HPLMN due to a limitation caused because the UE camps on the VPLMN. Consequently, a VoWiFi emergency call fails.

To avoid the foregoing VoWiFi emergency call failure and increase a VoWiFi emergency call success rate, this application further provides a technical solution of determining, based on an actual location of UE, whether the UE is located in a home country of an HPLMN, so as to determine whether the UE can initiate a VoWiFi emergency call. The following describes this application in detail with reference to accompanying drawings.

Figure 5:
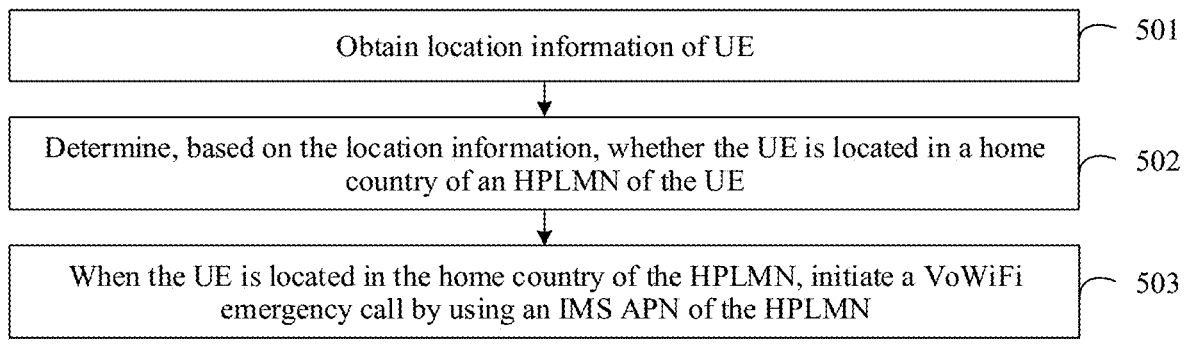
FIG. 5 is a schematic flowchart of another embodiment of a method for making a VoWiFi emergency call according to this application.

FIG. 5 is a schematic flowchart of another embodiment of a method for making an emergency call according to this application.

Step 501: Obtain location information of UE.

The location information is information that can be used to determine whether the UE is located in a home country of an HPLMN. For example, the location information may be latitude and longitude information of the UE, an area range in which the UE is located, or a mobile country code (MCC) of the UE.

The location information may be obtained in a plurality of manners, and the obtaining manner varies with specific content of the location information. For example, the UE may obtain the location information of the UE by using a satellite positioning system such as a global positioning system (GPS) or a BeiDou navigation satellite system (BDS); or may obtain the location information of the UE through WiFi positioning; or may directly obtain the MCC of the UE.

It should be noted that an occasion for obtaining the location information of the UE is not limited in this application. The UE may obtain the location information of the UE after it is determined that a VoWiFi emergency call needs to be initiated; or may obtain the location information of the UE before it is determined that a VoWiFi emergency call needs to be initiated; or may obtain the location information of the UE after an emergency call based on a cellular signal fails.

For example, when a VoWiFi emergency call needs to be initiated, the UE may first detect whether IMS registration is completed. If the UE has completed IMS registration, whether an emergency APN is set in a PLMN on which the UE camps is detected. If no emergency APN is set in the PLMN, the location information of the UE is obtained. If it is detected that an emergency APN is set in the PLMN on which the UE camps, a VoWiFi emergency call may be initiated by using the emergency APN.

For another example, when a VoWiFi emergency call needs to be initiated, the UE may first detect whether an emergency APN is set in a PLMN on which the UE camps. If no emergency APN is set in the PLMN, whether the UE has completed IMS registration is detected. If the UE has completed IMS registration, the location information of the UE is obtained. If an emergency APN is set in the PLMN, the UE may initiate a VoWiFi emergency call by using the emergency APN. A detailed process is not described herein.

Step 502: Determine, based on the location information, whether the UE is located in the home country of the HPLMN of the UE.

In embodiments of this application, the home country of the HPLMN may refer to a country or a region to which a telecommunications operator that runs the HPLMN belongs.

That the UE is located in the home country means that the UE is located in a geographical scope, of the country or region, in which initiation of a VoWiFi emergency call is allowed. Usually, the geographical scope may be the same as a territorial scope of the home country. In specified cases such as a case in which country A allows emergency calls in some regions in country B to be answered by a corresponding answering organization in country A, or a case in which country A allows emergency calls only in some regions in country A to be answered by a corresponding answering organization in country A, the geographical scope may be greater or less than the territorial scope of the country.

A specific implementation of determining, based on the location information of the UE, whether the UE is located in the home country of the HPLMN of the UE is not described herein.

Step 503: If the UE is located in the home country of the HPLMN of the UE, initiate an emergency call by using an IMS APN of the HPLMN of the UE.

If the UE is located in the home country of the HPLMN of the UE, when a predetermined condition is satisfied, an emergency call is initiated by using the IMS APN of the HPLMN of the UE. The predetermined condition includes: the UE has completed IMS registration and the PLMN on which the UE camps includes no emergency APN. That is, if the UE has completed IMS registration, and the PLMN on which the UE camps includes no emergency APN, when the UE is located in the home country of the HPLMN of the UE, the UE may initiate an emergency call by using the IMS APN of the HPLMN of the UE.

Figure 6:
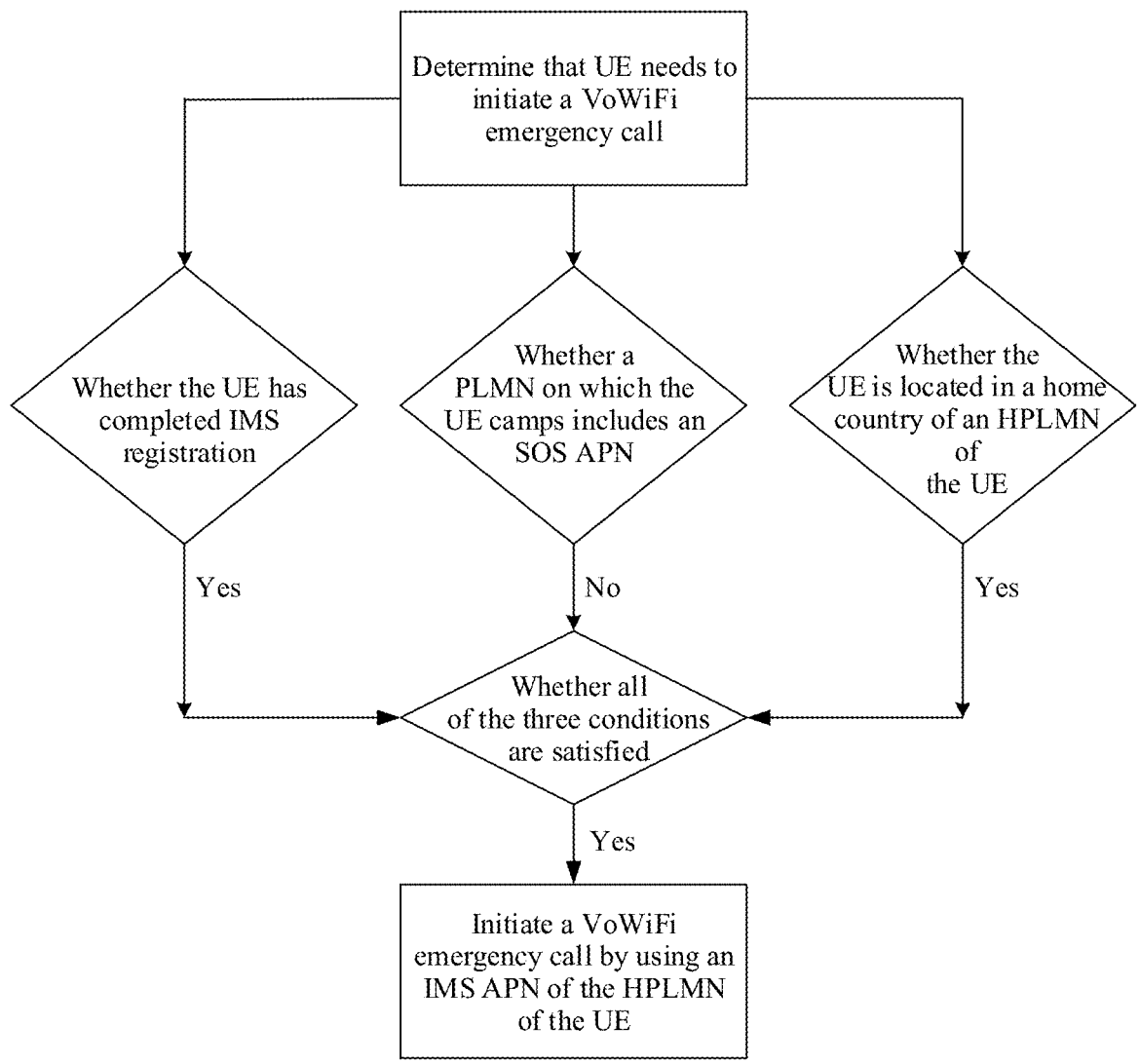
FIG. 6 is a schematic diagram of other determining logic of a method for making a VoWiFi emergency call according to this application.

It should be noted that a sequence of detecting whether the UE has completed registration, detecting whether the PLMN on which the UE camps includes an emergency APN, and determining whether the UE is located in the home country of the HPLMN of the UE is not limited in this application. Based on different actual applications, the UE may detect, in a parallel manner, whether the conditions are satisfied, or may detect, one by one, whether the conditions are satisfied. For specific determining logic, reference may be made to FIG. 6. Usually, the detection process may be determined based on the occasion for obtaining the location information.

For example, if the UE has obtained the location information of the UE before it is determined that a VoWiFi emergency call needs to be initiated, when a VoWiFi emergency call needs to be initiated, the UE may detect, in a parallel manner, whether the UE has completed IMS registration, whether the PLMN on which the UE camps includes an emergency APN, and whether the UE is located in the home country of the HPLMN of the UE. Alternatively, whether the UE has completed IMS registration, whether the PLMN on which the UE camps includes an emergency APN, and whether the UE is located in the home country of the HPLMN of the UE may be detected in a serial manner.

For another example, if the UE obtains the location information only after completing IMS registration and detecting that no emergency APN is set in the PLMN on which the UE camps, the UE needs to first detect, in a parallel or serial manner, whether the UE has completed IMS registration and whether the PLMN on which the UE camps includes an emergency APN, and then detects whether the UE is located in the home country of the HPLMN of the UE.

According to the method for making an emergency call provided in this application, when the UE is located in the home country of the HPLMN, even if the UE camps on a VPLMN, the UE can initiate a VoWiFi emergency call. In this way, a VoWiFi emergency call success rate can be increased to some extent.

Figure 7:
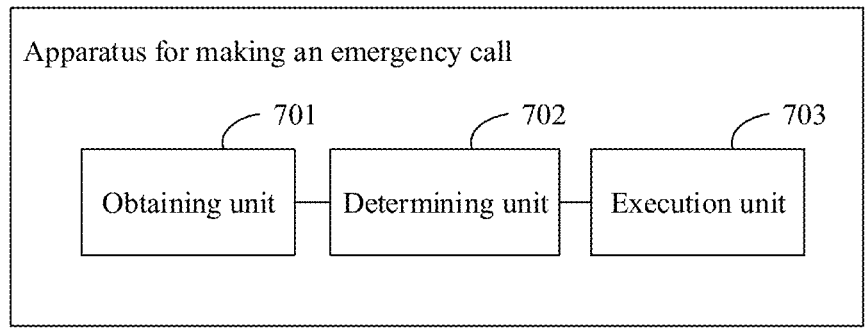
FIG. 7 is a schematic structural diagram of an embodiment of an apparatus for making a VoWiFi emergency call according to this application.

FIG. 7 is a schematic structural diagram of an embodiment of an apparatus for making an emergency call according to this application. As shown in FIG. 7, the apparatus may include an obtaining unit 701, a determining unit 702, and an execution unit 703.

The obtaining unit 701 is configured to obtain location information of user equipment UE. The determining unit 702 is configured to determine, based on the location information, whether the UE is located in a home country of an HPLMN of the UE. The execution unit 703 is configured to: when the UE is located in the home country of the HPLMN of the UE, if a predetermined condition is satisfied, initiate a VoWiFi emergency call by using an IP multimedia subsystem IMS access point name APN of the HPLMN. The predetermined condition includes: the UE has completed IMS registration and a PLMN on which the UE camps includes no emergency APN.

Optionally, the obtaining unit 701 is configured to obtain the location information of the UE by using a positioning system; or is configured to obtain a mobile country code MCC of the UE. Optionally, the positioning system includes a satellite positioning system or a WiFi positioning system, or may be a Bluetooth positioning system or a ZigBee positioning system, or may be a combination of a plurality of different types of positioning systems.

Optionally, the determining unit 702 is configured to: detect whether the UE has completed IMS registration; and if the UE has completed IMS registration, detect whether an emergency APN is set in the PLMN on which the UE camps. The obtaining unit 701 is configured to obtain the location information of the UE if no emergency APN is set in the PLMN.

Optionally, the determining unit 702 is configured to: detect whether an emergency APN is set in the PLMN on which the UE camps; and if no emergency APN is set in the PLMN, detect whether the UE has completed IMS registration. The obtaining unit 701 is configured to obtain the location information of the UE if the UE has completed IMS registration.

Optionally, the execution unit 703 is further configured to: detect, based on the location information, whether the UE is located in the home country of the HPLMN of the UE; if the UE is located in the home country of the HPLMN of the UE, detect whether an emergency APN is set in the PLMN on which the UE camps; and if no emergency APN is set in the PLMN, detect whether the UE has completed IMS registration.

Optionally, the execution unit 703 is further configured to: detect, based on the location information, whether the UE is located in the home country of the HPLMN of the UE; if the UE is located in the home country of the HPLMN of the UE, detect whether the UE has completed IMS registration; and if the UE has completed IMS registration, detect whether an emergency APN is set in the PLMN on which the UE camps.

Optionally, the execution unit 703 is further configured to: detect, based on the location information, whether the UE is located in the home country of the HPLMN of the UE; detect whether the UE has completed IMS registration; and detect whether an emergency APN is set in the PLMN on which the UE camps.

Optionally, the obtaining unit 701 is configured to obtain the location information of the UE after a VoLTE emergency call fails.

Optionally, the execution unit 703 is configured to initiate a VoWiFi emergency call by using the IMS APN of the HPLMN after a VoLTE emergency call fails.

Figure 8:
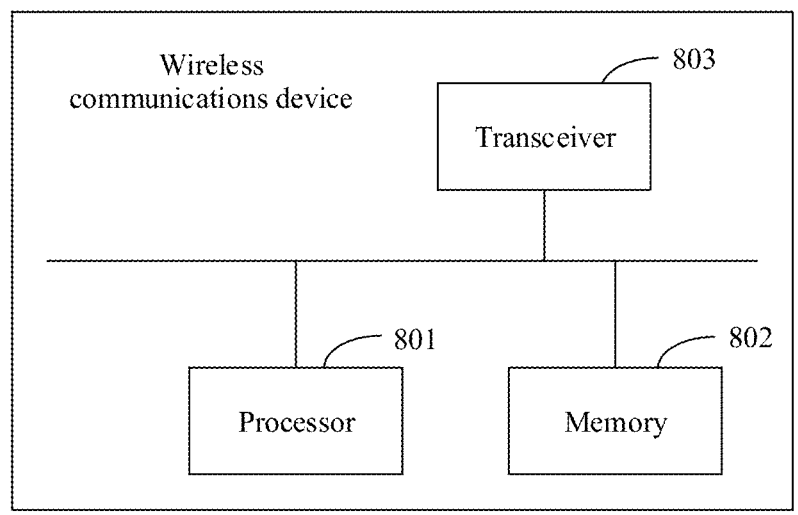
FIG. 8 is a schematic structural diagram of an embodiment of a wireless communications apparatus according to this application.

In specific hardware implementation, an embodiment of this application further provides a wireless communications device. The wireless communications device may be the UE in the method embodiments. As shown in FIG. 8, the wireless communications device may specifically include a transceiver 801, a processor 802, and a memory 803.

The processor 801 and the memory 802 are coupled to the transceiver 803. The wireless communications device may further include more or fewer components, or have some components combined, or have different component arrangements. This is not limited in this application.

The processor 801 is a control center of the wireless communications device, connects all parts of the entire wireless communications device by using various interfaces and lines, and executes various functions of the wireless communications device and/or processes data by running or executing a software program and/or a module stored in the memory 802 and invoking data stored in the memory. The processor may include an integrated circuit (IC), for example, may include a single packaged IC, or may include a plurality of connected packaged ICs with a same function or different functions. For example, the processor may include only a central processing unit (CPU), or may be a combination of a GPU, a digital signal processor (DSP), and a control chip (such as a baseband chip) in the transceiver. In an implementation of this application, the CPU may be a single operation core, or may include a plurality of operation cores.

The transceiver 803 is configured to establish a communications channel, so that the wireless communications device is connected to a receiving device through the communications channel, to transmit data between wireless communications devices. The transceiver may include a communications module such as a wireless local area network (WLAN) module, a Bluetooth module, or a baseband module and a radio frequency (RF) circuit corresponding to the communications module, and is configured to perform wireless local area network communication, Bluetooth communication, infrared communication, and/or cellular communications system communication, such as wideband code division multiple access (WCDMA) and/or high speed downlink packet access (HSDPA). The transceiver is configured to control communication between the components in the wireless communications device and can support direct memory access. The transceiver may further include a satellite signal receiving module, and the satellite signal receiving module is configured to receive a positioning signal sent by a satellite positioning system. The satellite signal receiving module may include a GPS satellite signal receiving module, a BeiDou satellite signal receiving module, or the like. The transceiver may further include a receiving module configured to receive other positioning information or another positioning signal, for example, a near field communication module.

In different implementations of this application, circuits or modules in the transceiver 803 are usually presented in a form of an integrated circuit chip, and may be selectively combined without a need to include all transceivers and corresponding antenna groups. For example, the transceiver may include only a baseband chip, a radio frequency chip, and a corresponding antenna, to provide a communications function in a cellular communications system. The wireless communications device may be connected to a cellular network or the internet by using a wireless communication connection established by the transceiver, such as wireless local area network access or WCDMA access. In some optional implementations of this application, a communications module such as a baseband module in the transceiver may be integrated into the processor. A typical example is an APQ+MDM family of platforms provided by Qualcomm. The radio frequency circuit is configured to receive and send a signal in an information receiving and sending process or a call process. For example, the radio frequency circuit receives downlink information of the wireless communications device and sends the downlink information to the processor for processing, and sends uplink-related data to the wireless communications device. Usually, the radio frequency circuit includes a well-known circuit configured to execute these functions, including but not limited to an antenna system, a radio frequency transceiver, one or more amplifiers, a tuner, one or more oscillators, a digital signal processor, a codec chip set, a subscriber identity module (SIM) card, a memory, or the like. In addition, the radio frequency circuit may further communicate with a network and another device through wireless communication. Any communications standard or protocol may be used for the wireless communication, including but not limited to a global system for mobile communications (GSM), a general packet radio service (GPRS), code division multiple access (CDMA), wideband code division multiple access (WCDMA), a high speed uplink packet access (HSUPA) technology, long term evolution (LTE), an email, a short message service (SMS), and the like.

Functions to be implemented by the obtaining unit, the determining unit, and the execution unit in the embodiment shown in FIG. 7 may be implemented by the transceiver of the wireless communications device, or may be implemented by the processor, or may be implemented by the processor by controlling the transceiver.

The transceiver or the processor may be configured to obtain location information of user equipment UE. The processor is configured to determine, based on the location information, whether the UE is located in a home country of an HPLMN of the UE. When the UE is located in the home country of the HPLMN, if a predetermined condition is satisfied, the transceiver initiates a VoWiFi emergency call by using an IMS APN of the HPLMN. The predetermined condition includes: the UE has completed IMS registration and a public land mobile network PLMN on which the UE camps includes no emergency APN. For an implementation of the method for making an emergency call, reference may be made to the foregoing embodiments. No repeated description is provided herein.

In specific implementation, this application further provides a computer storage medium, where the computer storage medium may store a program, and, when the program is executed, some or all of the steps of the embodiments of the call making method provided in this application may be performed. The storage medium may be a magnetic disk, an optical disc, a read-only memory (ROM), a random access memory (RAM), or the like.

A person skilled in the art may clearly understand that, the technologies in the embodiments of this application may be implemented by software in addition to a necessary general hardware platform. Based on such an understanding, the technical solutions of this application essentially or the part contributing to the prior art may be implemented in a form of a software product. The software product is stored in a storage medium, such as a ROM/RAM, a magnetic disk, an optical disc and the like, and includes several instructions for instructing a computer device (which may be a personal computer, a server, or a wireless communications device and the like) to perform the methods described in the embodiments or some parts of the embodiments of this application.

For same or similar parts in the embodiments in this specification, mutual reference may be made to these embodiments. Especially, wireless communications device embodiments are basically similar to a method embodiment, and therefore is described briefly; for related parts, refer to descriptions in the method embodiment.

The foregoing descriptions are implementation manners of this application, but are not intended to limit the protection scope of this application.

What is claimed is:

1. A method for making an emergency call, applied to a user equipment (UE), the method comprising:
   obtaining, by the UE, location information of the UE;
   determining, by the UE based on the location information, whether the UE is located in a home country of a home public land mobile network (HPLMN) of the UE;
   in response to the UE being located in the home country of the HPLMN and a predetermined condition being satisfied, initiating, by the UE, a voice over WiFi (VoWiFi) emergency call by using an IP multimedia subsystem (IMS) access point name (APN) of the HPLMN, wherein the predetermined condition comprises: the UE has completed IMS registration, and a public land mobile network (PLMN) on which the UE camps comprises no emergency APN;
   in response to the UE not being located in the home country of the HPLMN and being in a roaming state by camping on a visited public land mobile network (VPLMN) in a foreign country without any emergency APN, stopping, by the UE, any VoWiFi emergency call which is initiated by using the IMS APN of the HPLMN; and
   in response to the UE being located in the home country of the HPLMN and being in the roaming state by camping on the VPLMN, and in response to a second predetermined condition being satisfied, initiating, by the UE, a VoWiFi emergency call by using the IMS APN of the HPLMN, wherein the second predetermined condition comprises: the UE has completed the IMS registration, and the VPLMN comprises no emergency APN.

2. The method according to claim 1, wherein the obtaining the location information of the UE comprises:
   detecting, by the UE, whether the UE has completed the IMS registration;
   in response to the UE having completed the IMS registration, detecting, by the UE, whether an emergency APN is set in the PLMN on which the UE camps; and
   in response to no emergency APN being set in the PLMN, obtaining, by the UE, the location information of the UE.

3. The method according to claim 1, wherein the obtaining the location information of the UE comprises:
   detecting, by the UE, whether an emergency APN is set in the PLMN on which the UE camps;
   in response to no emergency APN being set in the PLMN, detecting, by the UE, whether the UE has completed the IMS registration; and
   in response to the UE having completed the IMS registration, obtaining, by the UE, the location information of the UE.

4. The method according to claim 1, wherein before initiating the VoWiFi emergency call by using the IMS APN of the HPLMN, the method further comprises:
   detecting, by the UE based on the location information, whether the UE is located in the home country of the HPLMN of the UE;
   in response to the UE being located in the home country of the HPLMN of the UE, detecting, by the UE, whether an emergency APN is set in the PLMN on which the UE camps; and
   in response to no emergency APN being set in the PLMN, detecting, by the UE, whether the UE has completed the IMS registration.

5. The method according to claim 1, wherein before initiating the VoWiFi emergency call by using the IMS APN of the HPLMN, the method further comprises:
   detecting, by the UE based on the location information, whether the UE is located in the home country of the HPLMN of the UE;
   in response to the UE being located in the home country of the HPLMN of the UE, detecting, by the UE, whether the UE has completed the IMS registration; and
   in response to the UE having completed the IMS registration, detecting, by the UE, whether an emergency APN is set in the PLMN on which the UE camps.

6. The method according to claim 1, wherein before initiating the VoWiFi emergency call by using the IMS APN of the HPLMN, the method further comprises:
   detecting, by the UE based on the location information, whether the UE is located in the home country of the HPLMN of the UE;
   detecting, by the UE, whether the UE has completed the IMS registration; and
   detecting, by the UE, whether an emergency APN is set in the PLMN on which the UE camps.

7. The method according to claim 1, wherein the obtaining the location information of the UE comprises:
   obtaining, by the UE, the location information of the UE after a voice over LTE (VoLTE) emergency call fails.

8. The method according to claim 1, wherein the obtaining the location information of the UE comprises:
   initiating, by the UE, a VoWiFi emergency call by using the IMS APN of the HPLMN after a voice over LTE (VoLTE) emergency call fails.

9. A user equipment (UE), comprising:
   a processor; and
   a non-transitory storage medium, wherein the non-transitory storage medium stores an instruction, and the instruction enables the UE to perform operations comprising:
   obtaining location information of the UE;
   determining, based on the location information, whether the UE is located in a home country of a home public land mobile network (HPLMN) of the UE;
   in response to the UE being located in the home country of the HPLMN, and in response to a predetermined condition being satisfied, initiating a voice over WiFi (VoWiFi) emergency call by using an IP multimedia subsystem (IMS) access point name (APN) of the HPLMN, wherein the predetermined condition comprises: the UE has completed IMS registration, and a public land mobile network (PLMN) on which the UE camps comprises no emergency APN;
   in response to the UE not being located in the home country of the HPLMN and being in a roaming state by camping on a visited public land mobile network (VPLMN) in a foreign country without any emergency APN, stopping any VoWiFi emergency call which is initiated by using the IMS APN of the HPLMN; and in response to the UE being located in the home country of the HPLMN and being in the roaming state by camping on the VPLMN, and in response to a second predetermined condition being satisfied, initiating a VoWiFi emergency call by using the IMS APN of the HPLMN, wherein the second predetermined condition comprises: the UE has completed the IMS registration, and the VPLMN comprises no emergency APN.

10. The UE according to claim 9, wherein the operation of obtaining the location information of the UE comprises:
   detecting whether the UE has completed the IMS registration;
   in response to the UE having completed the IMS registration, detecting whether an emergency APN is set in the PLMN on which the UE camps; and
   in response to no emergency APN being set in the PLMN, obtaining the location information of the UE.

11. The UE according to claim 9, wherein the operation of obtaining the location information of the UE comprises:
   detecting whether an emergency APN is set in the PLMN on which the UE camps;
   in response to no emergency APN being set in the PLMN, detecting whether the UE has completed the IMS registration; and
   in response to the UE having completed the IMS registration, obtaining the location information of the UE.

12. The UE according to claim 9, wherein before initiating the VoWiFi emergency call by using the IMS APN of the HPLMN, the operations further comprise:
   detecting, based on the location information, whether the UE is located in the home country of the HPLMN of the UE;
   in response to the UE being located in the home country of the HPLMN of the UE, detecting whether an emergency APN is set in the PLMN on which the UE camps; and
   in response to no emergency APN being set in the PLMN, detecting whether the UE has completed the IMS registration.

13. The UE according to claim 9, wherein before initiating the VoWiFi emergency call by using the IMS APN of the HPLMN, the operations further comprise:
   detecting, based on the location information, whether the UE is located in the home country of the HPLMN of the UE;
   detecting whether the UE has completed the IMS registration; and
   detecting whether an emergency APN is set in the PLMN on which the UE camps.

14. The UE according to claim 9, wherein the operation of obtaining the location information of the UE comprises:
   obtaining the location information of the UE after a voice over LTE (VoLTE) emergency call fails.

15. The UE according to claim 9, wherein the operation of obtaining the location information of the UE comprises:
   initiating a VoWiFi emergency call by using the IMS APN of the HPLMN after a voice over LTE (VoLTE) emergency call fails.

16. A non-transitory computer-readable storage medium, comprising an instruction, which when executed by a processor of a computer, causes the computer to perform operations comprising:
   obtaining location information of user equipment (UE);
   determining, based on the location information, whether the UE is located in a home country of a home public land mobile network (HPLMN) of the UE;
   in response to the UE being located in the home country of the HPLMN, and in response to a predetermined condition being satisfied, initiating a voice over WiFi (VoWiFi) emergency call by using an IP multimedia subsystem (IMS) access point name (APN) of the HPLMN, wherein the predetermined condition comprises: the UE has completed IMS registration, and a public land mobile network (PLMN) on which the UE camps comprises no emergency APN;
   in response to the UE not being located in the home country of the HPLMN and being in a roaming state by camping on a visited public land mobile network (VPLMN) in a foreign country without any emergency APN, stopping any VoWiFi emergency call which is initiated by using the IMS APN of the HPLMN; and
   in response to the UE being located in the home country of the HPLMN and being in the roaming state by camping on the VPLMN, and in response to a second predetermined condition being satisfied, initiating, by the UE, a VoWiFi emergency call by using the IMS APN of the HPLMN, wherein the second predetermined condition comprises: the UE has completed the IMS registration, and the VPLMN comprises no emergency APN.

17. The non-transitory computer-readable storage medium according to claim 16, wherein the operation of obtaining the location information of the UE comprises:
   detecting whether the UE has completed the IMS registration;
   in response to the UE having completed the IMS registration, detecting whether an emergency APN is set in the PLMN on which the UE camps; and
   in response to no emergency APN being set in the PLMN, obtaining the location information of the UE.

18. The non-transitory computer-readable storage medium according to claim 16, wherein the operation of obtaining the location information of the UE comprises:
   detecting whether an emergency APN is set in the PLMN on which the UE camps;
   in response to no emergency APN being set in the PLMN, detecting whether the UE has completed the IMS registration; and
   in response to the UE having completed the IMS registration, obtaining the location information of the UE.

19. The non-transitory computer-readable storage medium according to claim 16, wherein before initiating the VoWiFi emergency call by using the IMS APN of the HPLMN, the operations further comprise:
   detecting, based on the location information, whether the UE is located in the home country of the HPLMN of the UE;
   in response to the UE being located in the home country of the HPLMN of the UE, detecting whether an emergency APN is set in the PLMN on which the UE camps; and
   in response to no emergency APN being set in the PLMN, detecting whether the UE has completed the IMS registration.

20. The non-transitory computer-readable storage medium according to claim 16, wherein before initiating the VoWiFi emergency call by using the IMS APN of the HPLMN, the operations further comprise:
   detecting, based on the location information, whether the UE is located in the home country of the HPLMN of the UE;

detecting whether the UE has completed the IMS registration; and detecting whether an emergency APN is set in the PLMN on which the UE camps.

* * * * *